Figure 15:
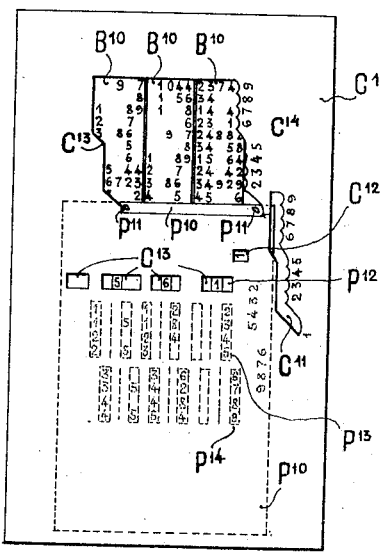

I. PLETNIK.
CALCULATING MACHINE.
APPLICATION FILED JUNE 13, 1910.
1,044,240.
Patented Nov. 12, 1912.
3 SHEETS—SHEET 1
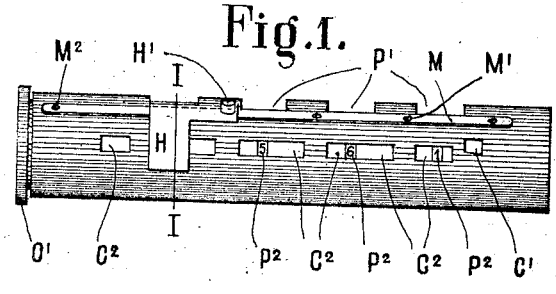
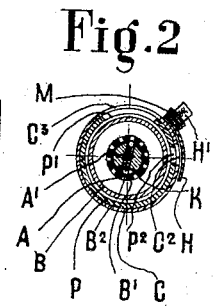
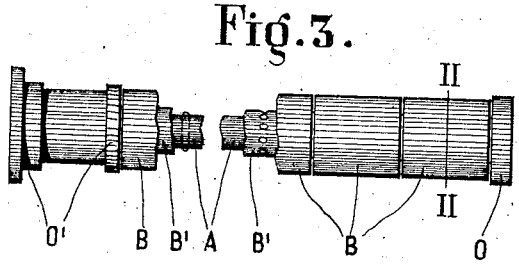
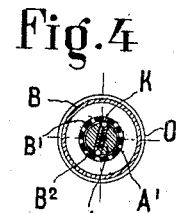
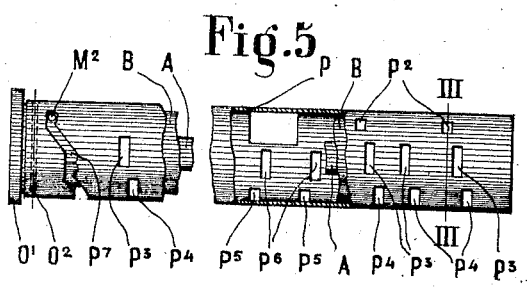
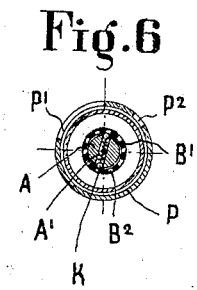
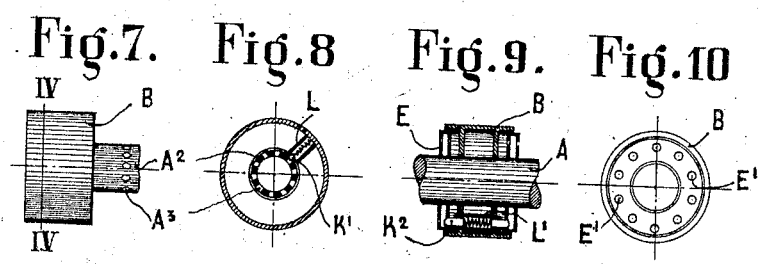

I. PLETNIK.
CALCULATING MACHINE.
APPLICATION FILED JUNE 13, 1910.
1,044,240.
Patented Nov. 12, 1912.
3 SHEETS—SHEET 2.
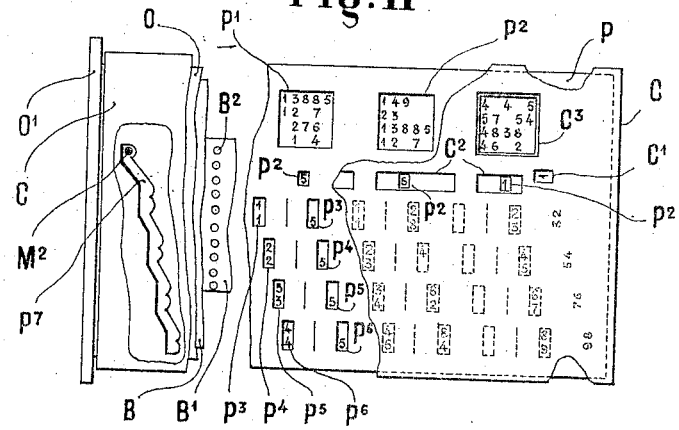

I. PLETNIK.
CALCULATING MACHINE.
APPLICATION FILED JUNE 13, 1910.

1,044,240.

Patented Nov. 12, 1912.
3 SHEETS—SHEET 3.

Witnesses

Inventor
I. Pletnik
by
Attorney

UNITED STATES PATENT OFFICE.

ITZEK PLETNIK, OF TZCHERKASSY, RUSSIA.

CALCULATING-MACHINE.

1,044,240.

Specification of Letters Patent.

Patented Nov. 12, 1912.

Application filed June 13, 1910. Serial No. 566,625.

*To all whom it may concern:*

Be it known that I, ITZEK PLETNIK, a subject of the Czar of Russia, residing at Tzcherkassy, Russia, have invented a certain new and useful Improved Calculating-Machine, of which the following is a specification.

This invention relates to calculating machines and has for its object to produce a simple apparatus, by means of which a unit or compound number can be multiplied or divided by a unit number and in which the tens of the multiplication of the lower order are automatically added to the units of the multiplication of the next higher order.

By simple addition of the products which can be read off from the new apparatus, the product of two compound numbers can then be obtained, while the quotient is found by subtraction. In order to attain this purpose, the following arrangement is adopted: The products of multiplication of the units 0-9 with the units 2-9 are so arranged in broken lines on the periphery of rotary drums, flat slides or bands, that the units of the product may always be found on one side, and the tens on the other side of the multiplicand which is arranged in the middle of the drum, slide or band, the tens forming similar broken lines to the units, i. e. the tens are always arranged equally apart from the appertaining units. The middle row also represents the products of 1-9 multiplied by 1. A sleeve or plate respectively is fitted above the drums, slides or bands, with apertures arranged in pairs for each drum, slide or band, in which the appertaining units and tens of the separate products of the numbers 0-9 with 0-9 appear, i. e. the apertures are also arranged in pairs displaced relatively to one another corresponding to the broken lines on the periphery of the drums, slides or bands in which the separate products are arranged. Further, a second outer sleeve or outer plate is provided with apertures arranged in a straight line and so arranged in relation to the middle of the drums, slides or bands that figures of the same order always appear in each aperture. Lastly an arrangement is adopted by means of which, after adjusting the given compound multiplicand, the multiplication of this multiplicand with any desired multiplication from 1-9 is made to appear in the above mentioned apertures by simply turning the outer drum or by moving the outer plate.

Reference will now be made to the accompanying drawings, in which various forms of apparatus constructed in accordance with the invention are illustrated.

Figure 16:
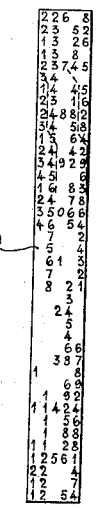
Figure 17:
Figure 18:
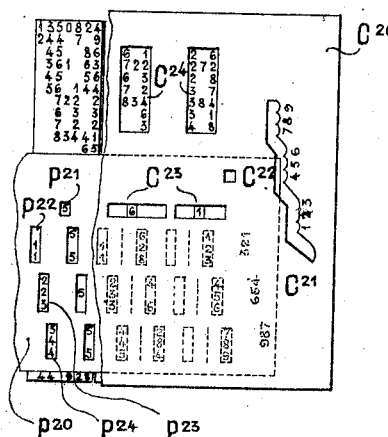
Figure 19:
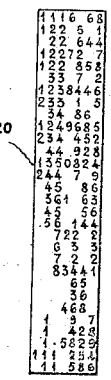
Figure 20:
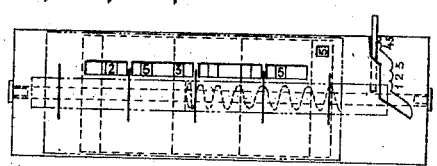

Figure 1 represents one form of apparatus in accordance with the invention of a cylindrical form and during the multiplication of 561 by 1. Fig. 2 is a section on the line I—I of Fig. 1. Fig. 3 shows the main spindle of the apparatus carrying the various drums, the figures on the periphery being omitted for the sake of clearness. Fig. 4 is a section on the line II—II of Fig. 3. Fig. 5 shows the inner sleeve arranged over the drums and having the apertures for the products of the units 1-9 when multiplied by the units 1-9 arranged in pairs and displaced relatively to one another. Fig. 6 is a section on the line III—III of Fig. 5. Fig. 7 represents a modified type of the spindle and drum. Fig. 8 is a section on the line IV—IV of Fig. 7. Fig. 9 is a longitudinal sectional elevation of a modification in the construction of the drums and their arrangement upon the main spindle. Fig. 10 is a side elevation of the arrangement in Fig. 9. Fig. 11 shows a developed view of the essential parts of the apparatus when of cylindrical form and a plan view of the flat type. Fig. 12 shows a development of the periphery of one of the drums on the main spindle of the cylindrical apparatus, which is also a view of one of the slides or the bands of the flat type of the apparatus, wherein the multiplicands are shown arranged in the middle row in the order 0, 9, 8, 7, etc. and the products of the multiplication of each unit of the middle row with the figures 2-9, in two lines divided into four stepped portions. Fig. 13 is a view essentially similar to Fig. 12, only that here the multiplicands are arranged in the order 0, 1, 2, 3, etc. In Fig. 14 the products are represented as they appear consecutively in the apertures of the outer sleeve or plate of the apparatus when multiplying the number 561 with the number 265. Fig. 15 shows a development of a cylindrical apparatus or a plan of a flat apparatus with three figure drums, slides or bands, whereby the separate products are arranged in lines having two stepped portions. Figs. 16 and 17 show the corresponding drum peripheries or the slides, whereby the multiplicands in the middle row run in the one case in the order 0, 1, 2, 3, etc., and in the other in the order 0, 9, 8, 7, etc. Fig. 18 is a view similar to Fig. 15 only that in this type the separate products are arranged in rows arranged in three steps on the drums or slides. Fig. 19 shows the developed periphery of a drum belonging to the type shown in Fig. 18 or a plan of a slide or band. In Fig. 20 the cylindrical type of the apparatus as shown in Figs. 18 and 19 is illustrated in elevation during the multiplication of the number 561 with 5.

In the cylindrical type the apparatus consists of a spindle A (Figs. 2, 3, 4, 5, 6 and 11), on which are fitted the drums B, and end drums O and O¹. These drums are enveloped by a drum P, which can be inserted in an outer sleeve C (Figs. 1, 2, and 11). Drums O and O¹ serve the purpose of spacing sleeve P from drums B so that the latter may rotate freely.

A transverse opening A¹ (Figs. 2, 3, 4 and 6) is provided in the spindle A for each drum B, in which a spring is arranged abutting at its ends upon balls K. The length of the spindle A corresponds to the dimensions of the drums B, O and O¹ carried by same. Each hub B¹ of the drums B (Figs. 2, 3, 4, 5, 6, 11, 12 and 13) is provided with ten recesses B² distributed at equal distances over the whole periphery. The spring-actuated balls K enter the recesses B² and thus connect the drums B with the spindle and thus serve to check rotation of drums B except as desired. The inner diameter of the hub B¹ is somewhat greater than the diameter of the spindle A, so that the drums B may easily rotate around the latter. The end drums O and O¹ and inclosing sleeve P are secured to the shaft H by a set screw.

The products of all figures from 0 to 9 multiplied with the figures 2 to 9 are arranged in stepped rows on the periphery of each of the drums B or, in a flat type of the apparatus, on the slides or bands B (Figs. 12, 13, 16, 17). Fig. 12 shows, by way of example, such an arrangement of the products on the developed periphery of one of the drums B or on a flat slide or a band, the multiplicands in the middle row being arranged in the order 0, 9, 8, 7, etc. The products of 2 to 9 are arranged in lines broken up into four steps on both sides of the middle row, the units of the products being on the right and the tens on the left of the middle row. The middle row represents the products of the multiplication with 1. In Fig. 12 the distribution of the products of the multiplication of 4 with all figures from 2 to 9 is indicated by dotted lines. The units of the products of the multiplication of 4 with 2 and 3 lie under one another under the first step of the broken line, while the tens of these products lie under the first step of the broken line indicated to the left of the middle row; the units of the products of the multiplication of 4 with the figures 4 and 5 lie under one another under the second right hand step, while the tens of these products will be found under the second left hand step; the units of the products of the multiplication of 4 with 6 and 7 are arranged under one another under the third right hand step and the tens of these products under the same left hand step; in the same way the units and tens of the products of the multiplication of 4 with 8 and 9 are arranged to the right and left of the middle multiplicand row under the fourth step of the broken line, i. e. the units of the product of the multiplication of 4 with 9 are found in the outer of the four right hand rows, while the tens of this product lie on the inner of the four left hand rows of figures. The products of the multiplication of all multiplicands of the middle row with all figures from 2 to 9 are also distributed in the same manner over the peripheries of the drums, or on the flat slides or bands B, the places with 0 being left blank for simplicity. As already mentioned above, the arrangement in Fig. 13 only differs from that in Fig. 12 in that with the former the multiplicands of the middle row are arranged in the order 0, 1, 2, 3, etc., while in Fig. 12 they run in the order 0, 9, 8, 7, etc.

In Fig. 13 the products of the multiplication of the unit 9 with all units from 2 to 9, as well as those of the multiplication of the unit 4 with all units from 2 to 9 in Fig. 12, are emphasized by dotted lines. The order of the multiplicands in the middle row is quite immaterial; for example, the multiplicands on the one drum can occur in one order and in another order on the other drum; in the same way the multiplicands can even be arranged without regard to any regular order whatever, e. g. 1, 9, 4, 7, 3, etc. without the action of the apparatus being influenced thereby, or the manipulation being subjected to any alteration. The chief thing is that the products of the multiplication of each multiplicand are arranged in the manner described above, each in two rows having four steps. This division of the products in two lines broken up into four steps results in all products of the multiplication of the units from 0 to 9 with the units 2 to 9 being arranged on the periphery of each drum or on each slide or band B in eight rows, the units in the four right hand and the tens in the four left hand rows.

In order that the various stepped rows in Figs. 12 and 13 may be easily picked out the following general description is given.

To pick out the stepped row giving the units of the products of any particular number with the number 2–9, first find the particular number in the middle row and then move to the right to the first column counting from the middle. Now move downward missing the first numeral encountered, and the second numeral is the unit of the product obtained by multiplying the selected number by 2, while the numeral just below this is the unit of the product obtained by multiplying by 3. Now move to the right to the second column and then downward, missing the first numeral encountered as before, and the second numeral encountered is the unit of the product obtained by multiplying the selected number by 4, and is also the first number of the second step. The number just under this last number is the unit of the product obtained by multiplying the selected number by 5. If the same method is repeated, the third step will be found, and then the fourth step can be found in a similar way. In order to find the tens of the product, move to the left to the fourth column, and repeat the method set out above.

The drums or wheels O and $O^1$ (Figs. 1, 3, 5 and 11) are wedged tightly on the spindle A. They serve as supports for the sleeve P and at the same time hold the figure drums B tightly on the spindle A. The diameters of the drums O and $O^1$ are somewhat larger than those of the figure drums B. The surface of the drum O is quite smooth and narrow, while the drum $O^1$ is longer and may have a groove in its surface which corresponds to the slot $P^7$ in the sleeve P (Figs. 5 and 11). Instead of the groove, the drum $O^1$ can also be of smaller diameter in its central portion as shown in Fig. 3 corresponding to the extension of the slot $P^7$ hereinafter described.

The sleeve P, which can be replaced by an ordinary plate in a flat type of the apparatus, fits tightly on the drums O and $O^1$, and as the diameters of the latter are made somewhat larger than those of the figure drums B, there remains a small amount of clearance between the inner surface of the sleeve P and the peripheries of the figure drums B. For each figure drum, slide or band, of which there can be any desired number, the sleeve P is provided with an aperture $P^2$ and two of each of the apertures $P^3$, $P^4$, $P^5$ and $P^6$, and of course these apertures may be covered with suitable transparent material. The apertures $P^2$ are so arranged that any multiplicand of the middle row of the corresponding figure drum appears therein, when the drum in question is retained in any position on the spindle A by the check action described above; simultaneously the units and tens of the products from the multiplication of the unit visible in $P^2$ with 2 and 3, appear in the two apertures $P^3$; the products obtained by the multiplication of the multiplicand in question in the middle row with the figures 4 and 5 appearing in the apertures $P^4$; those given by the multiplication with 6 and 7 in the pair of apertures $P^5$; while finally the products from the multiplication of the corresponding multiplicand by 8 and 9 appear in the apertures $P^6$. The apertures $P^3$, $P^4$, $P^5$ and $P^6$ must therefore correspond to the rows which are stepped four times and in which the various products are arranged on the figure drums, slides or bands. Further, an aperture $P^1$ is provided in the sleeve P, which permits of the figure drum B being turned with the finger. Of course in place of the totally inclosed sleeve P a slotted shield can also be used, only extending so far around the figure drum as is necessary for the accommodation of the apertures $P^2$, $P^3$, $P^4$, $P^5$ and $P^6$.

The sleeve or shield P is provided with a slot $P^7$ or groove at one end which runs in four steps similarly to the rows of products on the figure drums (Figs. 5, 11, 12 and 13), whereby the first step can be somewhat broader than that on the figure drums, but not longer. The one edge of the slot $P^7$ may be provided with teeth or recesses corresponding to the positions of the products of the multiplication by 1, 2, 3, 4, etc. on the figure drums B. Further, the numbers 1, 2, 3, etc., to 9 are arranged at one or both ends of the sleeve or shield P in an interrupted row similar to that of the slot $P^7$ (Fig. 11). The entire system of the sleeve P and the drums O and $O^1$ is tightly fixed on the spindle A by a screw, passing through the drum O or $O^1$, or other suitable means and inserted together in an outer sleeve C.

In the cylindrical type of the apparatus, the outer sleeve C (Figs. 1 and 11) is shaped as a tube closed at one end, while in the flat type of the calculating apparatus it can be replaced by an ordinary flat lid. In width and length the sleeve C is somewhat larger than the sleeve or shield P, so that the whole system connected together and as mentioned above can easily move in the outer sleeve C. The outer sleeve C has an aperture $C^1$, apertures $C^2$, the number of which exceeds by one the number of figure drums B the extra aperture (shown to the left of Fig. 1) being necessary for seeing the figures of the left hand drum which is moved to the left when the machine is operated, as well as apertures $C^3$, the number of which corresponds to that of the figure drums B. The aperture $C^1$ is hereinafter designated the multiplicator aperture. The apertures $C^2$ are so arranged on the outer sleeve C that they register with the slots $P^2$ in the sleeve or shield P, when the unit 1 of the shield P appears in the multiplicator aperture $C^1$ of the sleeve C, whereby the spaces between the apertures $C^2$ in the corresponding position of the whole system, register with one or two of the outer left hand row of figures on the drums B. Therefore it is only essential that the left edge of each space between the apertures $C^2$ should register with the outer left hand row of figures of the corresponding figure drum. The first right hand aperture $C^2$ and the first left hand aperture $C^2$ may be somewhat shortened on the right and left side respectively, so that both outer apertures $C^2$ appear somewhat shorter than the middle ones. (Figs. 1 and 11.) The various apertures $C^2$ can also be replaced by a single long slot, the above described spaces between each of the apertures $C^2$, which are of great importance for the use of the apparatus, being replaced by marking (painting with another color or the like) the centers between the pairs of apertures $P^3$, $P^4$, $P^5$ and $P^6$, so that the tens of the products of the one drum and the units of the products of the next left hand drum (of higher order) appear between each two such marks as figures of the same order. Such markings are indicated in the Figs. 11, 15 and 18 by dotted lines.

A slotted bar M is soldered or screwed on the sleeve C above the apertures $C^2$, on which a shield H is adapted to slide (Figs. 1 and 2). The slotted bar M is provided with recesses $M^1$ corresponding to the spaces between the apertures $C^2$. The upper edge of the shield H is fastened to the slotted bar M, while the smaller portion of same extending downward covers the left half of an aperture $C^2$ when the knob $H^1$ of the shield engages with one of the recesses $M^1$ mentioned above. The knob $H^1$ may be provided with a spring-actuated ball which is adapted to snap into one of the recesses $M^1$ for the purpose of temporarily fixing the shield H. Further, a pin or screw $M^2$ extending inwardly is provided on the sleeve C, which engages with the first or upper recess of the slot $P^7$ in the inner sleeve or shield P on the unit appearing in the multiplicator aperture $C^1$.

The arrangement of the above mentioned parts in the cylindrical type of the apparatus is as follows:—In the center is the spindle A (Figs. 3, 4 and 11). The figure drums B and the end drums O and $O^1$ are fitted on the spindle A, the drum B being so adjusted that the spring-actuated balls K snap in the recesses $B^2$ in the hubs $B^1$ and prevent the drums B being turned unintentionally. The whole is then so inserted in the sleeve or shield P that any unit of the middle row of figures of each drum is visible through the corresponding aperture $P^2$ (Fig. 11) in the sleeve P, and that the slot $P^7$ registers with the taper or recess in the drum $O^1$, whereupon the sleeve or shield P is connected to the spindle A in the manner described above. The outer sleeve C is arranged over the sleeve or shield P and the pin or screw $M^2$, which engages with the upper end of the slot $P^7$ when the unit 1 of the shield P appears in the multiplicator aperture $C^1$ is then inserted.

By this arrangement of the various parts the apparatus is distinguished by the following features:—(a.) When the unit 1 of the shield P is visible in the multiplicator aperture $C^1$ of the outer sleeve C, the figure drums B can be so turned with the finger through the apertures $C^3$ that the desired multiplicand number appears in the apertures $C^2$ of each drum. (b.) By means of the part of the drum $O^1$ projecting out of the sleeve C the inner system can be turned in the outer sleeve C, whereby the entire inner system will move to the left during this turning in the sleeve C owing to the engagement of the pin or screw $M^2$ in the slot $P^7$, so that during the adjustment of the multiplicator aperture on the number 2, the apertures $P^3$ at the same time also move one step to the left, so that the tens of the product obtained by the multiplication of the originally adjusted multiplicand with 2, will not appear in the same aperture $C^2$ as the original multiplicand, but in the next left hand one, in which however the units of the multiplication of the next multiplicand with 2 will also appear. The same will occur during the adjustment of the multiplicator aperture $C^1$ on 3, 4, 5, etc., the pairs of apertures $P^3$, $P^4$, $P^5$ and $P^6$ turning and moving to the left simultaneously. Owing to this feature, the multiplication of any desired compound number with any desired unit can be effected with the apparatus. For example, the number 561 is to be multiplied by 2. The apparatus is first set so that the number 1 is seen through the multiplicator aperture $C^1$, while the apertures $P^2$ are beneath the apertures $C^2$. Then the drums B are so adjusted that in the third aperture $C^2$ (from the right) the number 5 appears, in the second the number 6 and in the first the number 1. On relative rotation of the sleeves, the apertures $P^3$, $P^4$, etc., register in turn with apertures $C^2$ in order to expose the proper product numbers on drums B, and in t example taken the inner system is turned in the sleeve C by means of $O^1$ until the multiplicator 2 appears in $C^1$, whereupon the number 1122 will appear in the apertures $C^2$, i. e. the product of 561×2. To multiply the same number 561 with 6 the system is turned in the sleeve C until the number 6 appears in the multiplicator aperture $C^1$, whereupon the number 3366 will appear in the apertures $C^2$. On adjusting the multiplication aperture $C^1$ on 5 the number 2 will appear in the fourth aperture $C^2$ (from the right), in the third the numbers 5 and 3, in the second nothing and in the first the number 5. According to the above, however, this indicates the number 2 (5+3) 05=2805.

In Fig. 14 the multiplication of two multi-cipher numbers (561×265) is shown diagrammatically, the products of the successive multiplication of the number 561 by 2, 6 and 5 being arranged under one another as they must be read off from the apparatus, for the purpose of addition or transferred to an adding apparatus.

The division of two numbers can be effected in the following manner with the apparatus:—For example, the number 148665 is to be divided by 561. After so adjusting the sleeve C that the number 1 appears in $C^1$, the figure drums are adjusted to the divisor 561. By turning the inner system in the sleeve the number 1122 will be found in the apertures $C^2$ as the greatest possible subtrahend for the first (left hand) numbers of the dividend, whereby "2" will appear simultaneously in $C^1$ as the first number of the quotient. After subtraction of the first greatest possible subtrahend, the second greatest possible subtrahend 3366 is found in the manner described, whereby "6" appears in $C^1$ as the second number of the quotient, and lastly the number 2805 is found as third greatest possible subtrahend and "5" as third number of the quotient. The shield H only serves to separate the numbers being used from those not entering into consideration. If 6 figure drums are provided in the apparatus and a three figure number is to be multiplied, the knob $H^1$ is preferably placed next to the third space between the apertures $C^2$, so that to the right of the shield H only 3 apertures $C^2$ and a part of the fourth aperture are free. In the absence of such a shield the figure drums which do not come into consideration in the same operation as described above, would have to be adjusted on 0.

In the type of apparatus as shown in the Figs. 7 and 8 ten orifices or recesses $A^3$ are provided on the periphery of the spindle $A^2$ for each drum B, while a small tube L extends from the periphery of the drum to the hub, in which a spring is arranged and tends to press a ball $K^1$ in the openings $A^3$.

In the modification shown in the Figs. 9 and 10 disks are wedged on the spindle A, which are provided with ten openings or recesses $E^1$ on the sides; the drums B carry small tubes $L^1$ arranged longitudinally with the spindle A, in which springs are arranged by which balls or rounded pins $K^2$ are pressed into engagement with the recesses $E^1$. The guidance of the inner system in the sleeve C can be equally well effected by providing a slot or recess in the outer sleeve C, into which a pin on the inner sleeve or shield P projects, so that this outwardly projecting pin can serve at the same time to turn the whole system. Of course in this case the slot must be arranged reversely, i. e. with the steps from right to left. If only a single long aperture $C^2$ is provided for all the figure drums, the guide slot $P^7$ can be dispensed with, especially if the shield H is absent. Further, the apparatus can also be used without the outer sleeve C, especially in the flat type, whereby all separate products will then be visible simultaneously through the apertures in the shield P. The separate products can also be equally well arranged in rows with two or three steps. In the first case the multiplicands are arranged in any desired order in the middle row, e. g. 0, 1, 2, 3, etc., (Fig. 16) or 0, 9, 8, 7, etc., (Fig. 17), under the first step the products of the multiplication by 2, 3, 4 and 5 and under the second step those of the multiplication by 6, 7, 8 and 9, whereby, the same as in the arrangement described at the commencement, the units come to lie to the right and the tens of the products to the left of the middle row. The result of this arrangement is that all products are distributed in 5 rows, of which the two lying on the right of the middle row of multiplicands contain the units and the two to the left of the middle the tens of the products. To pick out the stepped rows in Figs. 16 and 17, the method given in connection with Figs. 12 and 13, should be followed, with the exception that, having found the first figure of the first step, it is then necessary to move down three figures, as there are four numerals in the first step. The next step can then be found, and will also contain four numerals. The apertures in the shield $P^{10}$ (Fig. 15) will also correspond to the arrangement of the products on the figure drums $B^{10}$ (Figs. 16 and 17) namely one aperture $P^{12}$ for the middle multiplicand row, a pair of apertures $P^{13}$ for the products of the multiplication by the figures 2, 3, 4 and 5 and a pair of apertures $P^{14}$ for the products of the multiplication with the figures 6, 7, 8 and 9. In this case, of course, the guide slot in the shield $P^{10}$ or in the outer sleeve $C^{10}$ will also only have two steps ($C^{11}$ Fig. 15). Here also the left edge of the space between each two apertures $C^{12}$ will have to register with the left row of figures of the figure drum in question.

With the arrangement of the products in rows with three steps, the products of the multiplication with the numbers 1, 2 and 3 lie under the first step, those of the multiplication by 4, 5 and 6 under the second step, and those of the multiplication with 7, 8 and 9 under the third step. The apertures in the inner sleeve or shield $P^{20}$ will correspond with the proper figures on the figure drums $B^{20}$ (Fig. 19) namely an aperture $P^{21}$ for the middle row of each figure drum, a pair of apertures $P^{22}$ for the multiplication with 1, 2 and 3, a pair $P^{23}$ for the products of the multiplication with 4, 5 and 6 and a pair $P^{24}$ for the products of the multiplication by 7, 8 and 9, while no alteration is necessary on the outer sleeve.

Having now described my invention what I claim as new and desire to secure by Letters Patent is:—

1. A calculating machine, comprising in combination a plurality of surfaces, a central row of units on each surface representing the multiplicand, stepped rows of figures on one side of said central row representing the units of the product, stepped rows of figures on the other side of said central row representing the tens of the products, and means whereby the surfaces may be adjusted relatively to each other.

2. A calculating machine, comprising in combination a plurality of surfaces, a row of units 0 to 9 centrally arranged on each surface representing the multiplicand, rows of figures in four steps on each side of said row representing respectively the units and tens of the product, and means whereby the surfaces may be adjusted relatively to each other.

3. A calculating machine comprising in combination, a spindle, a plurality of rotary drums thereon each bearing a central row of multiplicands and stepped rows of multiplication products on each side thereof, an apertured sleeve surrounding the drums relatively to which the latter may be turned, in order to render visible each multiplicand and also the units, tens, and so on of the products resulting from the multiplication of the visible multiplicand with all units from 1 to 9.

4. A calculating machine comprising in combination, a spindle, a plurality of rotary drums thereon, each bearing a central row of multiplicands and stepped rows of multiplication products on each side thereof, a plurality of apertured sleeves surrounding the drums relatively to which the latter may be turned, means whereby the outer sleeve may exhibit a multiplicator and multiplicands and means whereby the product of the multiplication of the multiplicand adjusted originally by the figure in the multiplicator aperture is exhibited in the apertures for the multiplicand.

5. A calculating machine comprising in combination, a spindle, a plurality of rotary drums thereon each bearing a central row of multiplicands and stepped rows of multiplication products on each side thereof, a sleeve around the drums with sets of apertures therein corresponding to the units and tens of the various drums, and having a stepped row of figures thereon, and a stepped slot therein, means for moving the drums relatively to the sleeve so that the desired product may be viewed.

6. A calculating machine comprising in combination, a spindle, a plurality of rotary drums thereon each bearing a central row of multiplicands and stepped rows of multiplication products on each side thereof, an inner and an outer apertured sleeve surrounding the drums relatively to which the latter may be rotated, apertures in the outer sleeve so arranged that the left edge of the sleeve material between two apertures is adapted to come over the left outer row of figures on the figure drums and a guide whereby the apertures showing the units and tens of the separate products, when the spindle is turned around during the adjustment of the multiplicator in its aperture, also simultaneously receive a corresponding movement so that figures of the same order always appear in each of the apertures in the outer sleeve.

7. A calculating machine comprising in combination, a spindle, a series of rotary drums thereon bearing multiplicands and product figures, an inner and an outer apertured sleeve surrounding the drums, and means whereby the drums and inner sleeve may be simultaneously rotated and longitudinally adjusted relatively to the outer apertured sleeve for the purpose described.

8. A calculating machine comprising in combination, a spindle, a series of rotary drums thereon bearing multiplicands and product figures, an inner and an outer apertured sleeve surrounding the drums, means whereby the drums may be rotated relatively to one another and means whereby all the drums and inner sleeve are simultaneously rotated and longitudinally adjusted relatively to the outer apertured sleeve for the purpose described.

9. A calculating machine comprising in combination, a spindle, a series of rotary drums thereon bearing a central row of multiplicand figures and stepped rows of product figures, an inner and an outer apertured sleeve surrounding the drums, means whereby the drums may be rotated relatively to one another into predetermined positions and temporarily retained therein, and means whereby all the drums and inner sleeve are simultaneously rotated and longitudinally adjusted relatively to the outer sleeve for the purpose described.

10. A calculating machine comprising in combination, a spindle, a series of rotary drums thereon bearing a central row of multiplicand figures and side groups in steps of product figures, an inner and an outer apertured sleeve surrounding the drums, means whereby the drums may be rotated relatively to one another into predetermined positions and temporarily retained therein, a slot in the outer sleeve, a slide movable relatively to the slot, and means whereby all the drums and inner sleeve are simultaneously rotated and longitudinally adjusted relatively to the outer sleeve for the purpose described.

11. A calculating machine comprising in combination, a spindle, a series of rotary drums thereon, bearing a central row of multiplicand figures and stepped rows of product groups, an inner apertured sleeve surrounding the drums and having at one end a stepped slot and bearing a stepped row of multiplicators, an outer apertured sleeve, a pin thereon engaging the stepped slot on the inner sleeve, means whereby the drums may be rotated relatively to one another into predetermined positions and temporarily retained therein, a slot in the outer sleeve, a slide movable in the slot, and means whereby all the drums and inner sleeve are simultaneously rotated and longitudinally adjusted relatively to the outer sleeve as and for the purpose described.

In testimony whereof I affix my signature in presence of two witnesses.

ITZEK PLETNIK.

Witnesses:
 H. A. LOVIAGUINE,
 M. INIVARENDRE.